United States Patent [19]
Reynolds et al.

[11] 3,963,857
[45] June 15, 1976

[54] SMALL MAGNET WIRE TO LEAD WIRE TERMINATION

[75] Inventors: Charles Edward Reynolds, Mechanicsburg; Charles Harry Weidler, Lancaster, both of Pa.

[73] Assignee: AMP Incorporated, Harrisburg, Pa.

[22] Filed: Sept. 12, 1974

[21] Appl. No.: 505,422

[52] U.S. Cl. .............................. 174/84 C; 336/192; 339/97 C; 339/276 C
[51] Int. Cl.² .......................................... H01P 5/08
[58] Field of Search ....... 336/192; 339/97 C, 276 R, 339/276 C, 276 T, 98; 174/84 C

[56] References Cited
UNITED STATES PATENTS

| | | | |
|---|---|---|---|
| 3,111,554 | 11/1963 | Harris | 339/276 R X |
| 3,137,925 | 6/1964 | Wahl | 339/276 R X |
| 3,259,874 | 7/1966 | Esser | 339/97 C |
| 3,355,698 | 11/1967 | Keller | 339/97 C |
| 3,496,504 | 2/1970 | Daley | 336/192 X |
| 3,663,914 | 5/1972 | Lane | 336/192 |
| 3,742,412 | 6/1973 | Lakin | 336/192 |
| 3,852,702 | 12/1974 | Dowling | 339/276 T X |

*Primary Examiner*—Thomas J. Kozma
*Attorney, Agent, or Firm*—William J. Keating; Donald W. Phillion

[57] ABSTRACT

A terminal for connecting a fine magnet wire to a larger wire with relatively thick insulation. The terminal has a barrel at one end section thereof with serrations extending substantially circumferentially around the inner surface thereof. At the other end of said terminal there is a second barrel with tangs extending inwardly therein. The fine magnet wire is laid within the end of the barrel containing the serrations. The large wire with the heavy insulation is laid within both sections of said barrel including the portion containing the tangs and the portion containing the serrations. Crimping of both barrels in the terminal causes the heavy insulation on the large wire to force the magnet wire into the barrel serrations, thereby elongating the magnet wire and breaking the shellac or fine plastic insulation thereon so that the magnet wire makes electrical contact with the barrel. Because of the relatively soft and resilient nature of the heavy insulation on the large wire the forces on the magnet wire are distributed along the magnet wire so that breakage or weakening of the magnet wire is minimized while at the same time insuring electrical contact between the magnet wire and the barrel. The tangs penetrate through the heavy insulation and make contact with the metal portion of the larger conductive wire. Thus, electrical connection is made between the large wire and the magnet wire through the barrel.

3 Claims, 5 Drawing Figures

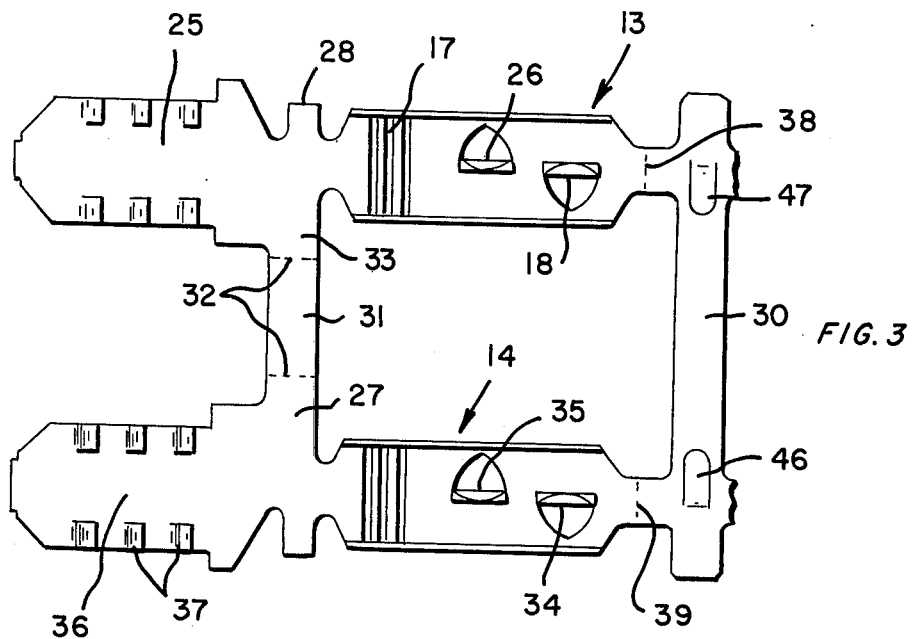
FIG. 3
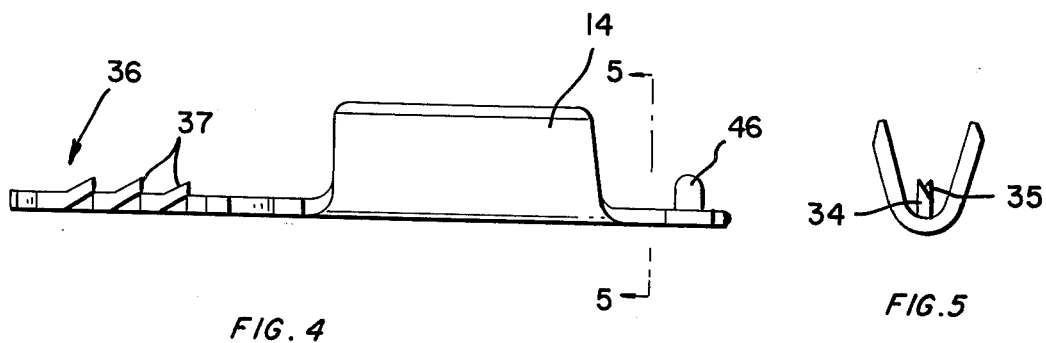
FIG. 4
FIG. 5

SMALL MAGNET WIRE TO LEAD WIRE TERMINATION

BACKGROUND OF THE INVENTION

This invention relates generally to the splicing together of a small wire and a large wire and more particularly to the termination of a small fragile wire, such as a magnet wire, and a larger lead-in wire, particularly of the stranded wire type.

There are many applications where it is necessary to connect together a very small wire, such as a magnet wire which is commonly used in small electric motors, and a larger lead-in wire, which frequently is of the stranded wire type. Such applications occur, for example, in synchronous motors employed in electric clocks and also in the new type ignition systems employed in the automotive industry which utilize a fine wire wound upon a bobbin which must be connected to a larger lead-in wire. While in some of these applications the larger lead-in wire is solid copper, many of the larger lead-in wires are of the stranded wire type.

In the prior art one common way of connecting a magnet wire to a larger lead-in wire is to lay both wires side-by-side within the barrel of a terminal which had serrations therein running substantially circumferentially around the terminal barrel. When the barrel is crimped shut, the magnet wire and the larger wire are forced together, with the magnet wire hopefully being forced into the serrations within the terminal barrel thereby causing the magnet wire to become elongated and break the thin shellac or plastic insulation which is commonly coated on magnet wires.

However, the foregoing method of splicing has certain disadvantages whether the larger wire is a solid conductor or a stranded wire. In the case where the larger wire is a solid conductor, the fine, fragile magnet wire is trapped between the relatively hard surfaces of the copper conductor and the metal serrations of the terminal barrel with the result that breakage of the magnet wire often occurs, or serious weakening of the wire might occur, with actual breakage happening later while the circuit is in actual use.

In those cases where the larger wire is of the stranded type, the magnet wire frequently is simply forced into the maze of stranded wires with the result that the insulation coating thereon is never broken and electrical contact between the magnet wire and the stranded wire does not occur.

A more recent means of connecting magnet wires to a larger wire, elastomeric substances are placed in the serrated barrel along with the magnet wire. When the barrel is crimped, the resilient and relatively soft elastomeric material will force the magnet wire into the serrations in the barrel, thereby stretching the magnet wire and breaking the insulation thereon so that the copper underneath can and will make good electrical contact with the serrated portion of the terminal barrel. A larger wire can then be connected to another portion of the terminal in a conventional manner.

While the last-mentioned method of connecting a magnet wire to a large wire works very well and is believed to be generally superior to any other known method for certain applications, it does require a specially prepared terminal barrel containing a piece of elastomeric material and a separate means for making contact with a larger wire. The electrical contact between the magnet wire and the larger wire occurs through the metal body of the terminal.

BRIEF STATEMENT OF THE INVENTION

It is an object of the present invention to provide a solderless means for splicing together a magnet wire and a large wire, either solid or stranded, without the use of elastomeric material but with all the advantages of the use of elastomeric material.

It is a further object of the invention to provide a terminal for splicing together a fine, fragile magnet wire and a larger lead-in wire, either solid or stranded, without placing undue strain upon the fine magnet wire when crimping occurs.

It is a third aim of the invention to provide a crimpable terminal means for splicing together a small fragile magnet wire and a larger terminating wire, either solid or stranded, in which the plastic coating of the larger wire is employed as an elastomeric material to force the stranded wire into serrations in the terminal barrel, with actual electrical connection between the magnet wire and the larger wire occurring through the metal body of the terminal.

It is a fourth object of the invention to provide a terminal for splicing together a small magnet wire and a larger lead-in wire by employing the plastic coating on the larger wire as the means for forcing the small magnet wire into serrations in the terminal barrel, thereby causing an electrical connection between the terminal and the small magnet wire, and with the connection between the terminal and the larger wire being made at another portion of the terminal by more conventional means, such as a tang which protrudes through the plastic coating on the large wire.

It is a fifth object of the invention to improve generally means for splicing together small magnet wires and larger lead-in wires, either solid or stranded.

In accordance with one form of the invention there is provided a terminal having a barrel with serrations extending circumferentially around the inner surface of a first end section of said barrel, and with tang means at the other end section of said barrel which extend into the barrel. A magnet wire is laid across said first section of the barrel containing the serrations. A larger wire, having a relatively thick plastic-type insulation, is laid across the entire length of the barrel including that portion containing the serrations and also that portion containing the inwardly extending tangs. The barrel is crimped tightly upon the magnet wire and the larger wire contained therein. Such crimping action forces the insulation of the larger wire against the magnet wire, causing the magnet wire to flow (i.e., to be cold worked) into the serrations and thereby stretching it so that the insulation on said magnet wire is ruptured to create an electrical contact between its copper portion of said magnet wire and the terminal barrel. The inwardly extending tangs of the barrel penetrate through the insulation of the larger wire during crimping to make contact with the large conductor within the plastic insulation. The large conductor can be either a solid conductor or it can be stranded wire. In this manner, electrical contact is made between the magnet wire and the larger wire through the barrel of the terminal.

In accordance with another form of the invention there is provided, in combination with said terminal means, a plastic housing which is constructed to be mounted upon a bobbin or a coil winding form and which is further constructed to retain said terminals therein.

A feature of the combination of the plastic housing and the terminals is means for retaining at least one lead-in wire in said housing and enabling said lead to lay in the trough of said terminal barrel prior to crimping of said terminal to facilitate the manufacturing and fabrication of the final structure which includes the coil bobbin, the plastic housing and the terminals held thereon.

BRIEF DESCRIPTION OF THE FIGURES

The above-mentioned and other objects and features of the invention will be more fully understood when read in conjunction with the drawings in which:

FIG. 3 is a top view of the formed and stamped terminals of the subject invention;

FIG. 4 is a side view of the structure of FIG. 1; and

FIG. 5 is an end view of the structure of FIG. 3.

DETAILED DESCRIPTION OF THE INVENTION

Figure 1:
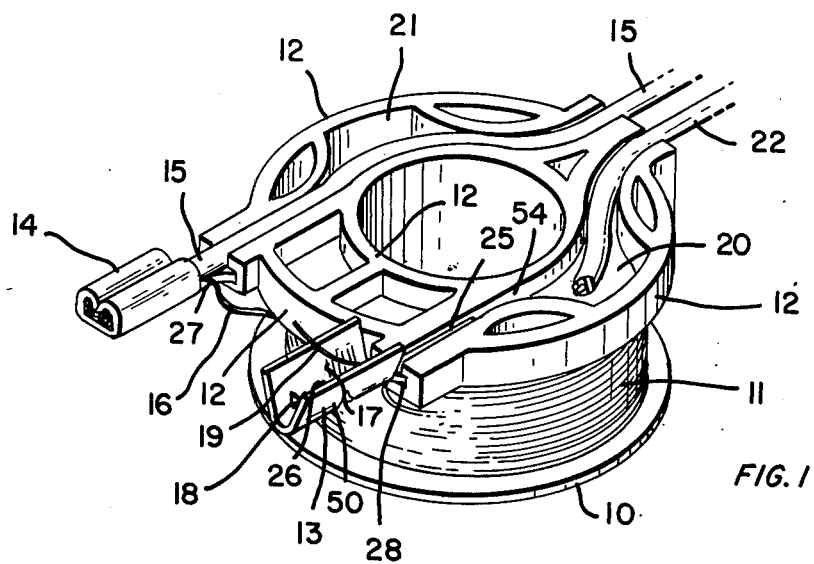
FIG. 1 shows an assembly of a pair of the terminals of the present invention secured upon a plastic housing, which in turn is mounted upon a magnet wire holding bobbin.

Referring now to FIG. 1 there is shown an assembly of the invention including two terminals 13 and 14, and a plastic housing 12 which is mounted upon a bobbin or coil form 10.

Coil form 10 contains a magnet wire coil 11 wound thereon with the two lead ends 19 and 16 being supplied into the barrels of the two terminals 13 and 14, respectively. One of said two terminals 13 and 14, namely terminal 13, is shown with the barrel 50 open, that is, in an uncrimped condition and with the magnet wire 19 laid therein. A larger wire 22 is laid in slot 20 in housing 12 and in fact would extend into and through the barrel of terminal 13. For purposes of clarity it is shown as not being so extended. The second terminal 14 is shown with the barrel crimped around the magnet wire which has been laid therein, and also a larger lead-in conductor 15 which is coated with a relatively heavy plastic coating.

Thus, in FIG. 1 both the magnet wires 16 and 19 and the larger conductors 15 and 22 are laid into the barrels of the two terminals 14 and 13. Considering only terminal 13 since the inside thereof can be seen in FIG. 1, it is only necessary that the magnet wire 11 be laid in the serrated portion 17 of said barrel 50. The larger insulated wire 22 is then laid throughout the entire barrel of terminal 13 as well as extending through the groove 20 formed in plastic housing 12.

The larger lead-in wire 22 is retained within the groove 20 in plastic housing 12 to facilitate construction as indicated above, and also to provide a protective and insulating retaining means for said conductor 22 after the structure of FIG. 1 is installed in its final operation location, such as an ignition system in a car.

Figure 2:
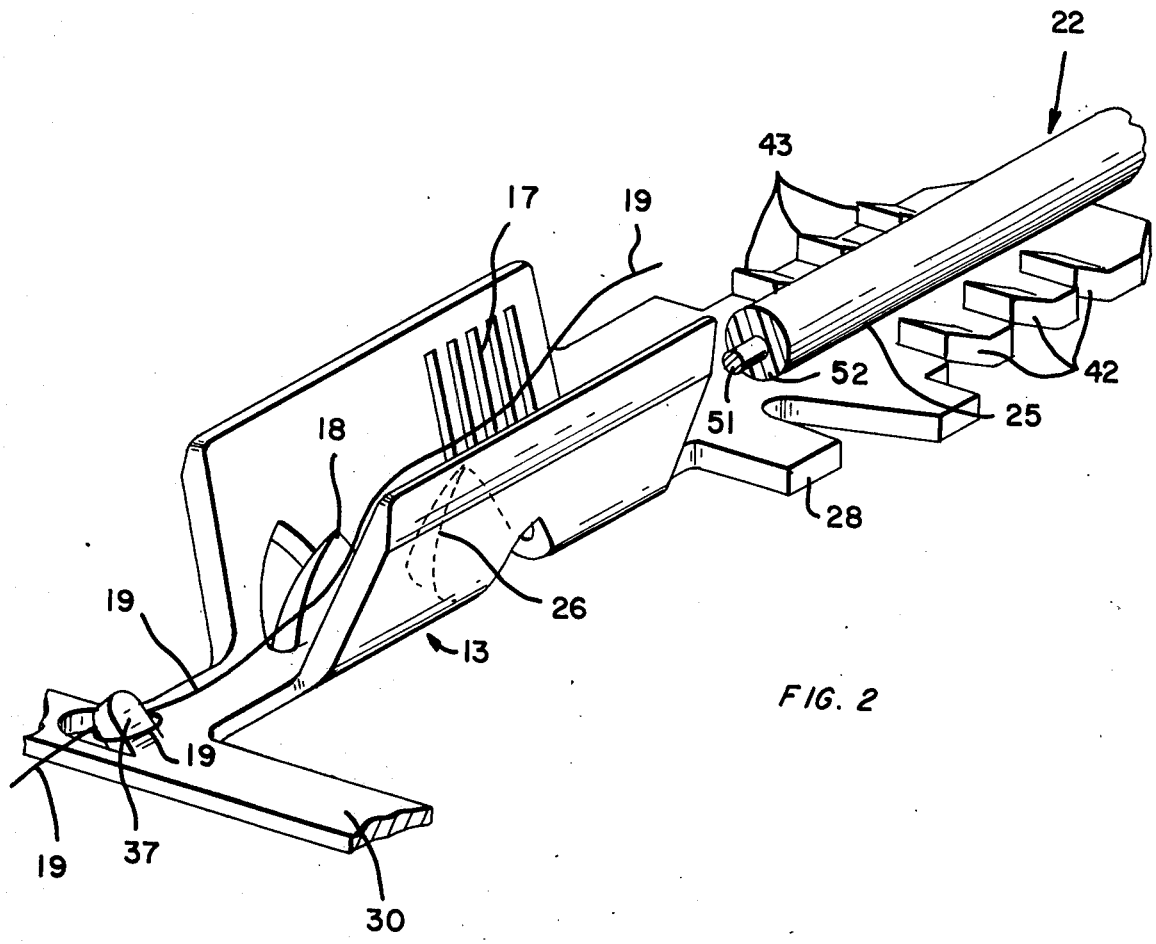
FIG. 2 is a perspective view of one of said terminals.

Means are also provided to secure the small magnet wire 19 within the barrel 50 prior to the crimping operation. Such means is not shown in FIG. 1 but is shown in FIG. 2 and also in FIGS. 3 and 4. More specifically, referring to FIG. 2, the small magnet wire 19 is laid within the barrel 50 of terminal 13 and the end thereof brought out and wrapped around a tang 37 which is formed in the carrier 30. The function and extent of the carrier 30 can be more clearly seen from the structure of FIG. 3 where it can be seen to couple together a pair of terminals 13 and 14. A pair of terminals is employed in each coil bobbin assembly, as shown in FIG. 1. The carrier 30 usually is retained on the terminals 13 and 14 until complete assembly of the structure of FIG. 1 has occurred, including crimping of terminals 13 and 14. The carrier 30 is then cut off.

Referring again to FIG. 1 the purpose for extending the larger wire 22 through the entire length of barrel 50 is two-fold. Firstly, the insulation on the wire 22 is employed as a means of forcing the magnet wire 19 into the serrations 17 of barrel 50 to elongate said magnet wire 19 and thereby break the insulation thereon. As the insulation on magnet wire 19 is broken the copper conductor underneath will make electrical contact with the serrated portion of barrel 50. It is to be noted that by using the relatively soft plastic insulation on the large conductor 22 as a means of forcing the magnet wire 19 into the serrated portions of barrel 50 as said barrel 50 is crimped upon the two wires therein, the relatively fragile magnet wire 19 is much less subject to weakening so that future breakage might occur than would be the case if the magnet wire were forced into the serrated portion 17 by a hard material, such as a copper conductor, for example.

The second reason why the larger conductor 22 extends through the entire length of barrel 13 is to enable the tangs 18 and 26 to penetrate into and through the plastic coating 52 of the conductor 22 and thereby make contact with the copper conductor 51 enclosed therein. Thus the barrel 50 makes contact both with conductor 51 and also with magnet wire 19, thus creating an electrical connection between conductor 51 and magnet wire 19.

It is to be noted that the larger conductor 51 can either be a solid conductor or it can be of the stranded wire type. The tangs 18 and 26 will effectively penetrate the insulation 52 on conductor 22 to make a good electrical contact with either a solid or stranded wire type conductor.

The sequence of steps of assembling the structure shown in FIG. 1 is generally as follows. The two terminals 13 and 14 are formed in the manner shown in FIG. 3 and are connected by two carriers 30 and 31. The carrier 31 is cut from the terminals at the dotted lines 32 during the stamping and fabrication of said terminals. However, the carrier 30 remains for a while.

The structure of FIG. 3, without the carrier 31, is then inserted into the plastic housing 12 of FIG. 1 by means of the tabs 25 and 36 of FIG. 3. These tabs 25 and 36 have tangs formed on the edges thereof, such as tangs 37, which fit into grooves or receiving slots 54 in the housing 12, as shown in FIG. 1. The terminals 13 and 14 are thus retained securely in the housing 12.

Next, the housing 12, with the retained terminals 13 and 14 still in an open barrel condition, is then mounted upon the bobbin 10, which contains coil 11. The coil 11 is a fine magnet wire in the typical case of synchronous clock motors or automobile ignition systems, as mentioned earlier herein.

The securing of the plastic housing 12 upon the bobbin 10 can be done by any one of several means, such as bonding or friction fitting.

The two magnet wires 19 and 16, which form the two ends of the coil 11, are then laid within the two terminals 13 and 14 which are still joined together by the carrier 30, as shown in FIG. 3. The two magnet wires 19 and 16 are then wound around the upright tangs 37 and 36 formed in the carrier 30 for purposes of temporary holding until crimping of the terminals 13 and 14 is accomplished.

Next, the larger wires 15 and 22 (FIG. 1) which are coated with a relatively heavy insulation are then laid into slots 20 and 21 in housing 12 and also through the entire length of the barrels of the two terminals 13 and 14. The crimping of terminals 13 and 14 is then accomplished by appropriate crimping machinery to produce the result represented by the crimped terminal 14 of FIG. 1.

During the crimping operation, as discussed above, the insulation of the larger wire 15 will force a small magnet wire 16 into the serrated portion of the barrel, breaking the shellac or thin plastic insulation thereon and causing an electrical contact to be made between the magnet wire and the barrel. The connection between the larger wire 15 and the barrel 14 will be produced as a result of tangs, similar to the tangs 18 and 26 shown in the open barrel 13 of FIG. 1.

The final step of the assembly is the cutting off of the common carrier 30 of FIG. 3 along the dotted line 38 and 39, which also removes the loose ends of the magnet wires which have been wound around the upright tangs 36 and 37 for temporary holding of the magnet wires.

It is to be understood that the form of the invention shown and described herein is but a preferred embodiment thereof and that various changes in the design and configuration of the structure can be made without departing from the spirit or scope of the invention.

What is claimed is:

1. In combination, a terminal connecting together a magnet wire having a first insulation coating thereon to a larger diameter wire having an inner conductor and a second insulation thereon and comprising:
    barrel means having an irregularly shaped inner surface formed integrally therewith;
    said barrel means comprising insulation piercing tangs formed integrally with said barrel means and extending inwardly into said barrel means;
    said insulation piercing tangs offset with respect to said irregularly shaped surface along the axis of said barrel means;
    said magnet wire positioned within said barrel means across said irregularly shaped inner surface thereof;
    said larger diameter wire, including its insulation coating, positioned within said barrel means across said irregularly shaped inner surface and across said insulation piercing means;
    said terminal being crimped to cause the insulation of said larger diameter wire to force said magnet wire into said irregularly shaped inner surface to rupture said first insulation coating thereon to create an electrical connection between said magnet wire and said barrel means;
    said crimped terminal further positioning said insulation piercing means through the insulation of said larger diameter wire and into electrical contact with said inner conductor thereof.

2. An integral crimped terminal connecting a magnet wire having a first insulation coating thereon to a larger diameter wire having an inner conductor and a second insulation coating thereon and comprising:
    barrel means of unitary construction comprising serrations on a first portion of the inner surface thereof and which extend around the inner surface of said barrel means;
    said barrel means further comprising insulation piercing tangs formed integrally with said barrel means and extending inwardly into a second portion of said barrel means which is axially offset with respect to said first portion of said barrel means;
    said magnet wire, including said first insulation coating thereon, positioned within said barrel means and across said serrations;
    said larger diameter wire, including said second insulation coating thereon, positioned within said barrel means across said serrations and said insulation piercing tangs;
    said terminal crimped to cause the insulation coating of said larger diameter wire to force said magnet wire into said serrations to rupture said first insulation coating thereon to create an electrical connection between said magnet wire and said barrel means;
    said terminal further crimped to force said insulation piercing tangs through the insulation of said larger diameter wire and into said inner conductor thereof.

3. An integral crimped terminal connecting a fragile small gauge, single strand wire having a first insulation coating thereon to a larger diameter wire having an inner conductor and a second insulation coating thereon and comprising:
    first barrel portion means having serrations extending around the inner surface thereof;
    second barrel portion means integrally secured to said first barrel portion means in an axially aligned manner and axially offset with respect to said first barrel portion means;
    said second barrel portion means having tang means formed integrally therewith and extending inwardly into said second barrel portion means;
    said small gauge wire positioned within said first barrel portion means;
    said larger diameter wire positioned within said first and second barrel portion means;
    said terminal being crimped to cause the insulation of said larger diameter wire to force said small gauge wire into said serrations to rupture said first insulation coating thereon to create an electrical connection between said small gauge wire and said first barrel means;
    said terminal further crimped to force said tang means through the insulation coating of said larger diameter wire and into said inner conductor thereof.

* * * * *